United States Patent
Jung et al.

(10) Patent No.: US 11,366,486 B2
(45) Date of Patent: Jun. 21, 2022

(54) METHOD FOR EXECUTING APPLICATION BY USING CLOCK SPEED OF PROCESSOR SELECTED ACCORDING TO EXTERNAL TEMPERATURE, AND ELECTRONIC DEVICE INCLUDING SAME

(71) Applicant: Samsung Electronics Co., Ltd., Gyeonggi-do (KR)

(72) Inventors: Chunghyo Jung, Gyeonggi-do (KR); Jung Nam, Gyeonggi-do (KR); Jungeun Lee, Gyeonggi-do (KR); Sangwon Chae, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 17/262,798

(22) PCT Filed: Aug. 8, 2019

(86) PCT No.: PCT/KR2019/009968
§ 371 (c)(1),
(2) Date: Jan. 25, 2021

(87) PCT Pub. No.: WO2020/032619
PCT Pub. Date: Feb. 13, 2020

(65) Prior Publication Data
US 2021/0165442 A1    Jun. 3, 2021

(30) Foreign Application Priority Data

Aug. 8, 2018    (KR) .................. 10-2018-0092646

(51) Int. Cl.
*G06F 1/08*    (2006.01)
*G06F 1/26*    (2006.01)
(Continued)

(52) U.S. Cl.
CPC .............. *G06F 1/08* (2013.01); *G06F 1/26* (2013.01); *G06F 9/48* (2013.01); *G06F 1/206* (2013.01);
(Continued)

(58) Field of Classification Search
CPC ........ G06F 1/324; G06F 1/206; G06F 9/4893; G06F 1/08; G06F 1/26; G06F 9/48; G06F 1/3203
(Continued)

(56) References Cited

U.S. PATENT DOCUMENTS

| 5,278,730 | A | 1/1994 | Kikinis | |
| 5,481,210 | A * | 1/1996 | Genzel | G06F 1/06 326/101 |
| 6,415,388 | B1 * | 7/2002 | Browning | G06F 1/3203 713/322 |
| 7,937,599 | B1 | 5/2011 | Thomas et al. | |

(Continued)

FOREIGN PATENT DOCUMENTS

| JP | 9-512654 A | 12/1997 |
| JP | 2011-174816 A | 9/2011 |

(Continued)

*Primary Examiner* — Ji H Bae
(74) *Attorney, Agent, or Firm* — Cha & Reiter, LLC

(57) ABSTRACT

According to various embodiments, an electronic device comprises a temperature sensor, a display, and a processor configured to operate by using a clock speed selected from among a plurality of clock speeds, wherein the processor may be configured to: execute a designated application by using one selected from among the plurality of clock speeds; check an external temperature by using the temperature sensor for at least some time during the execution of the designated application; when the external temperature falls to within a range of a first designated temperature, execute the designated application by using one selected from among the plurality of clock speeds according to a desig- (Continued)

nated clock governor; and when the external temperature falls to within a range of a second designated temperature that is lower than the first designated temperature, execute the designated application by using one selected from among the plurality of clock speeds, except for some higher clock speeds, according to the designated clock governor. In addition, various other embodiments are possible.

15 Claims, 14 Drawing Sheets

(51) Int. Cl.
  *G06F 9/48* (2006.01)
  *G06F 1/3203* (2019.01)
  *G06F 1/20* (2006.01)
  *G06F 1/324* (2019.01)
(52) U.S. Cl.
  CPC ............ *G06F 1/3203* (2013.01); *G06F 1/324* (2013.01); *G06F 9/4893* (2013.01)
(58) Field of Classification Search
  USPC .................................................. 713/322, 501
  See application file for complete search history.

(56) References Cited

U.S. PATENT DOCUMENTS

| | | | |
|---|---|---|---|
| 2010/0049995 A1* | 2/2010 | Casey | ................... G06F 1/3203 |
| | | | 713/300 |
| 2011/0199149 A1* | 8/2011 | Wilson | ..................... G06F 1/08 |
| | | | 327/512 |
| 2011/0205071 A1 | 8/2011 | Namekawa et al. | |
| 2013/0111241 A1* | 5/2013 | Ha | ...................... H04W 52/029 |
| | | | 713/322 |
| 2014/0136868 A1* | 5/2014 | Lee | ......................... G06F 1/324 |
| | | | 713/322 |
| 2017/0351279 A1 | 12/2017 | Ishii | |
| 2018/0181171 A1 | 6/2018 | Jang et al. | |
| 2021/0255746 A1* | 8/2021 | Hu | ......................... G06F 1/3228 |

FOREIGN PATENT DOCUMENTS

| | | |
|---|---|---|
| JP | 2015-001396 A | 1/2015 |
| JP | 2015-011594 A | 1/2015 |
| JP | 2017-220027 A | 12/2017 |
| KR | 10-2009-0012571 A | 2/2009 |
| KR | 10-2015-0134772 A | 12/2015 |
| KR | 10-2017-0015097 A | 2/2017 |
| KR | 10-2018-0074377 A | 7/2018 |

* cited by examiner

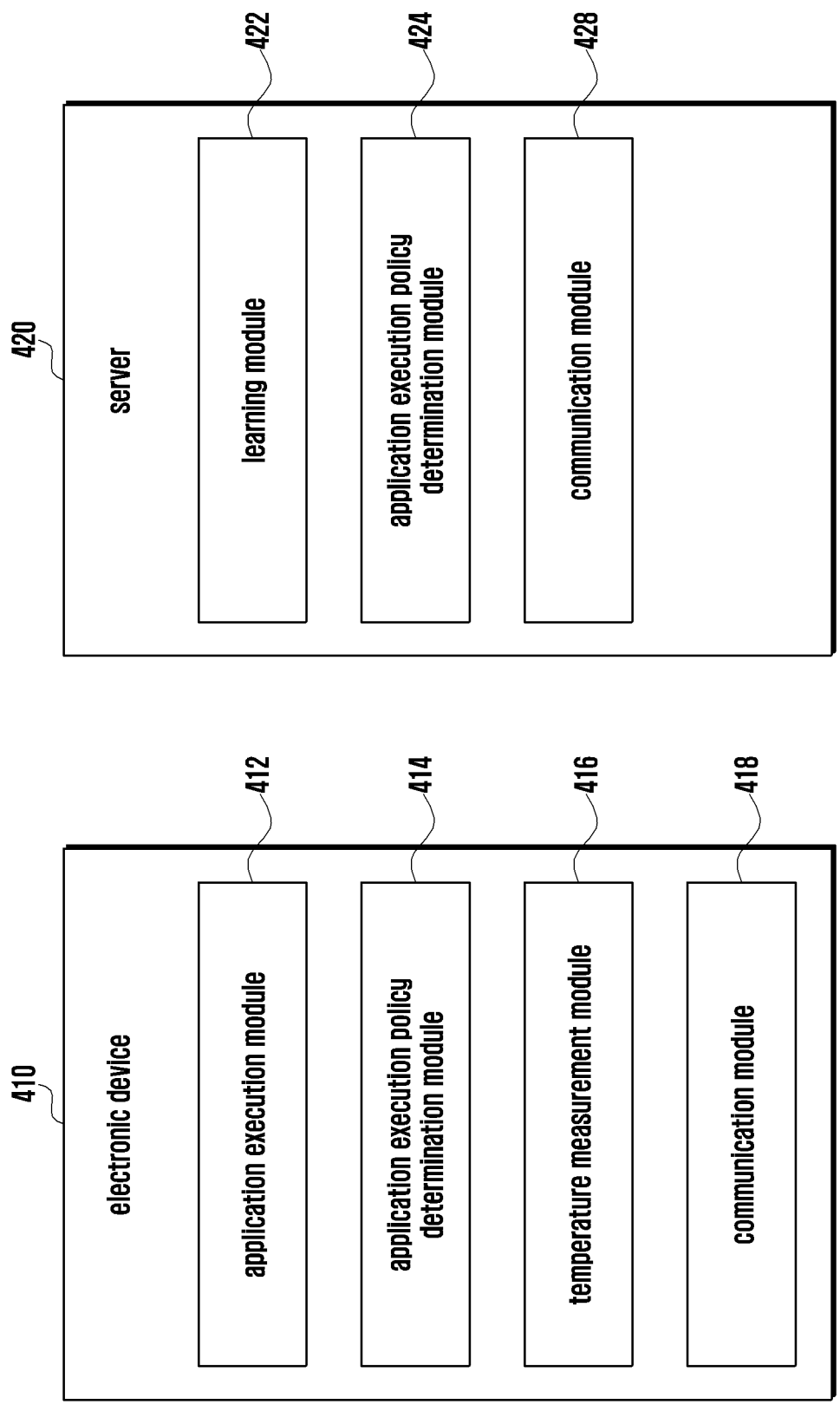

METHOD FOR EXECUTING APPLICATION BY USING CLOCK SPEED OF PROCESSOR SELECTED ACCORDING TO EXTERNAL TEMPERATURE, AND ELECTRONIC DEVICE INCLUDING SAME

CROSS-REFERENCE TO RELATED APPLICATION(S)

This application is a National Phase Entry of PCT International Application No. PCT/KR2019/009968, which was filed on Aug. 8, 2019 and claims priority to Korean Patent Application No. 10-2018-0092646, which was filed on Aug. 8, 2018, the contents of which are incorporated herein by reference.

TECHNICAL FIELD

The disclosure relates to an electronic device and, more particularly, to an electronic device that may control the clock speed of a processor when executing an application, and a method of controlling the clock speed of an electronic device.

BACKGROUND ART

As mobile communication and hardware/software technologies have developed, portable electronic devices (hereinafter, electronic devices), which are represented by smartphones, have continued to evolve and have become to provide various functions. Electronic devices may install and execute various applications and may provide various user experiences to users.

Applications installed and executed by an electronic device require various specifications, and thus, the electronic device may control a clock speed, a frame per second (FPS), and the like according to the specifications required by a corresponding application.

DISCLOSURE OF INVENTION

Technical Problem

If an electronic device operates at a high clock speed, the electronic device may provide a high performance to a user when executing an application, but problems related to battery consumption, heat generation, and the like may arise.

Conventionally, an electronic device determines hardware performance, such as a clock speed or the like, according to a policy determined for each application. However, this does not take into consideration various situations associated with the use of an electronic device, such as ambient temperature or the like, and thus, the performance of an application, heat generation, and the like may not be optimized.

Solution to Problem

In accordance with an aspect of the disclosure, an electronic device may include a temperature sensor, a display, and a processor configured to operate using a clock speed selected from among a plurality of clock speeds, wherein the processor is configured to: execute a designated application using one clock speed selected from among the plurality of clock speeds; identify an external temperature using the temperature sensor during at least a partial time while the designated application is being executed; if the external temperature falls within a first designated temperature range, execute the designated application using a clock speed selected from among the plurality of clock speeds according to a designated clock governor; and if the external temperature falls within a second designated temperature range which is lower than the first designated temperature, execute the designated application using a clock speed selected from among the plurality of clock speeds, excluding some fast clock speeds, according to the designated clock governor.

In accordance with another aspect of the disclosure, a method of controlling a clock speed of an electronic device may include: executing a designated application; identifying the external temperature of the electronic device during at least a partial time while the designated application is being executed; if the external temperature falls within a first designated temperature range, executing the designated application using a clock speed selected from among a plurality of clock speeds according to a designated clock governor; and if the external temperature falls within a second designated temperature range which is lower than the first designated temperature, executing the designated application using a clock speed selected from among the plurality of clock speeds, excluding some fast clock speeds, according to the designated clock governor.

In accordance with another aspect of the disclosure, an electronic device may include a temperature sensor, a display, and a processor configured to operate using a clock speed selected from among a plurality of clock speeds, wherein the processor is configured to: identify an external temperature using the temperature sensor; if the external temperature is less than a designated first temperature, select a first clock speed according to a first execution policy corresponding to a designated application, and execute the application based on the first clock speed; and if the external temperature is greater than or equal to the first temperature, select a second clock speed according to a second execution policy which is different from the first execution policy, and execute the application based on the second clock speed.

Advantageous Effects of Invention

According to various embodiments of the disclosure, there is provided an electronic device, which is capable of optimizing the performance of an application and heat generation of the electronic device, by determining an application execution policy in consideration of an ambient temperature when executing an application, and a method of controlling the clock speed of an electronic device.

BRIEF DESCRIPTION OF DRAWINGS

FIG. 4 is a block diagram illustrating a software module of an electronic device and a server device according to various embodiments;

MODE FOR THE INVENTION

Figure 1:
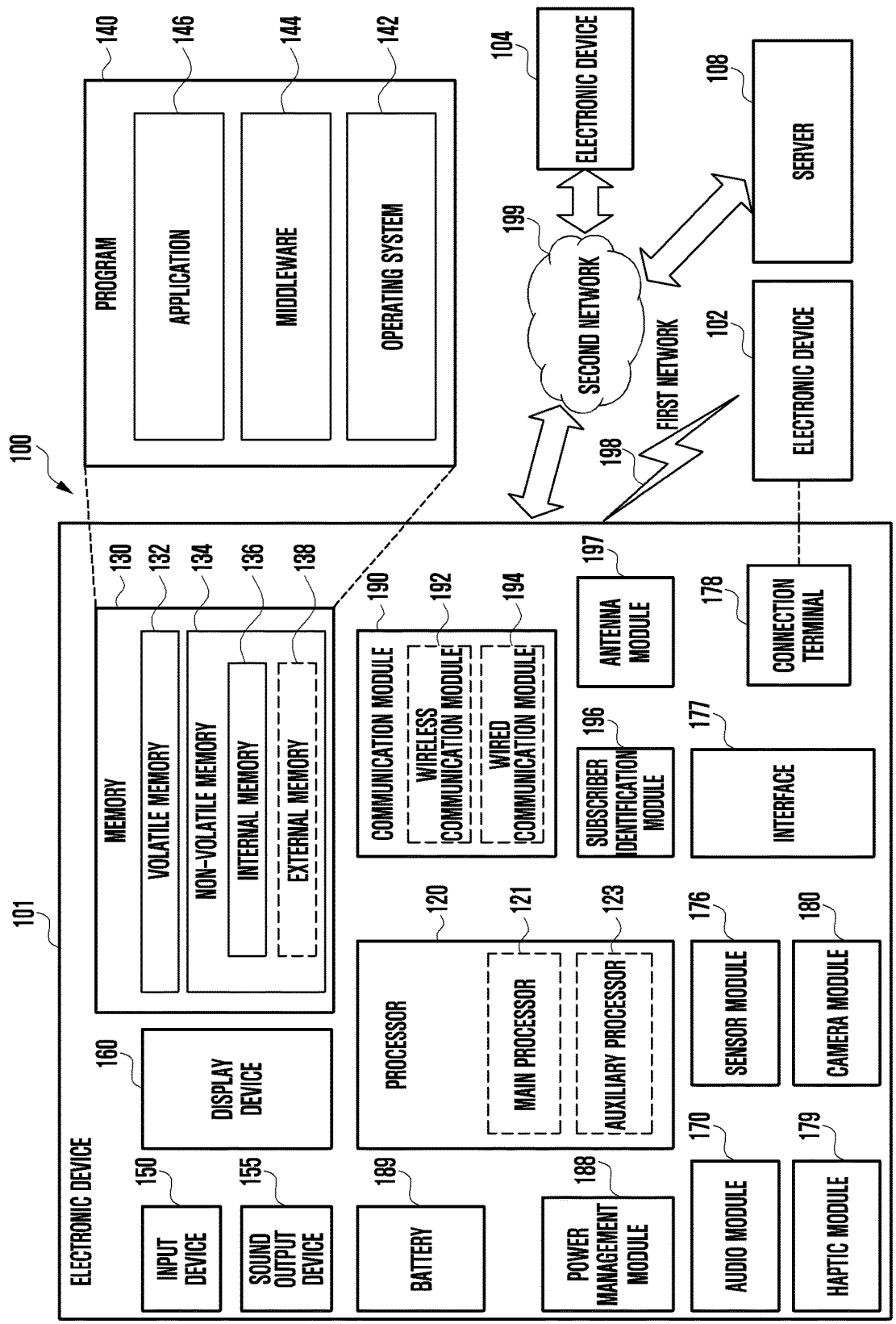
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
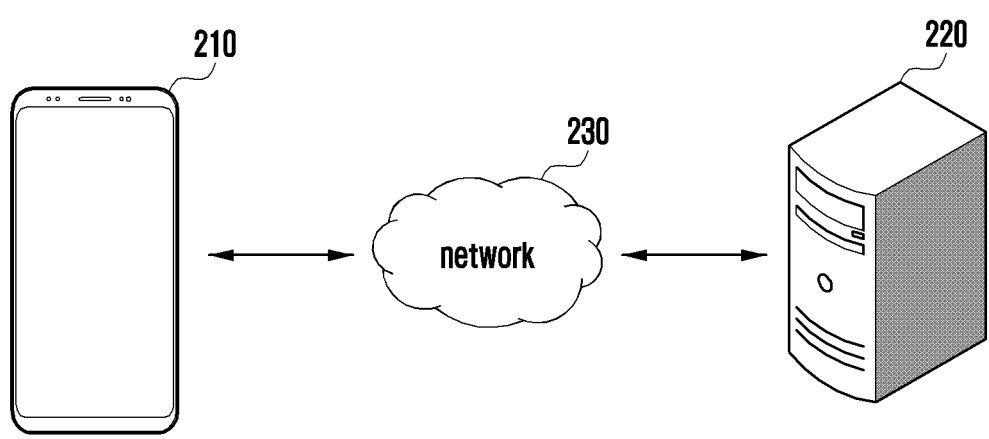
FIG. 2 is a diagram schematically illustrating an electronic device and a server device according to various embodiments.

FIG. 2 is a diagram schematically illustrating an electronic device and a server device according to various embodiments.

Referring to FIG. 2, an electronic device 210 and a server device 220 may perform data transmission/reception over a network 230. Although a single electronic device 210 is illustrated in FIG. 2, there may be a plurality of electronic devices, which are connected to the server device 220 and are capable of performing data transmission/reception, such as reception of an application execution policy. For example, the server device 220 is a server operated by the manufacturer of the electronic device 210, and a plurality of electronic devices connected to the server device 220 may be electronic devices manufactured by the same manufacturer. For example, the server device 220 may be the server 108 of FIG. 1.

According to various embodiments, the electronic device 210 may be a publicly known portable electronic device 210 which is capable of executing various applications, such as a smart phone, a tablet PC, and the like, but the examples thereof are not limited thereto. The electronic device 210 may include at least a part of the configuration and/or functions of the electronic device 101 of FIG. 1.

Although the type of application and the number of applications that the electronic device 210 is capable of executing is not limited, the disclosure will be described by taking a game application for an example. In the case of a game application, although the electronic device 210 executes a single game application, the electronic device 210 may control the performance of a processor that operates an application of the electronic device 210 based on the progress of the game. For example, in the case in which a high level of graphic and operation processing is required, the electronic device may control the clock speed, the target current, and the frame per second (FPS) of a processor (e.g., an application processor, a central processing unit (CPU), a graphics processing unit (GPU) and the like) to be high. Conversely, if the situation is sufficiently satisfied with a low level of graphic and operation processing, the electronic device may set the parameters to low values.

By taking a clock speed for an example, the electronic device 210 may select any one of a plurality of clock speeds according to a designated clock governor, and may execute an application using the selected clock speed. In addition, the electronic device 210 may change the clock speed by request from the application while the application is being executed. Here, the plurality of clock speeds may be discrete values, or may be continuous values.

A clock governor relates to a policy of determining a clock speed when a processor (e.g., an application processor, a CPU, or a GPU) operates, and may be determined by request from an application or user settings. For example, the clock governor may be, for example, a policy (e.g., ondemand) of increasing a clock speed according to the amount of use of a processor, a policy (e.g., conservation) of decreasing the increment of a clock speed if a load occurs in a processor, a policy (e.g., performance) of maintaining the maximum clock speed, a policy (e.g., power save) of maintaining the minimum clock speed needed for executing an application, and the like.

According to various embodiments, the electronic device 210 may determine a method of selecting a clock speed based on the external temperature of the electronic device 210. For example, if the external temperature falls within a first designated temperature range (e.g., approximately 0° C. or higher), the electronic device 210 may execute an application using one selected from among a plurality of clock speeds according to a designated clock governor. In addition, if the external temperature falls within a second designated temperature range (e.g., less than 0), the electronic device 210 may execute the application using one selected from among the plurality of clock speeds, excluding some fast clock speeds, according to the designated clock governor. For example, in the case in which the external temperature falls within the second designated temperature range, although a clock speed is determined by the clock governor, if the determined clock speed is greater than a predetermined speed, the electronic device 210 may not use the determined clock speed, and may execute the application using a clock speed lower than the determined clock speed.

According to various embodiments, the server device 220 may determine an execution policy associated with an application of the electronic device 210 (e.g., a game application), and may provide the same to the electronic device 210. The server device 220 may receive, from a plurality of electronic devices 210, heat generation information and performance information associated with the execution of a predetermined application, and may determine an execution policy based thereon. For example, the server device 220 may determine an optimal parameter (e.g., a clock speed, FPS, or the like) associated with the heat generation of the electronic device 210 and a game performance using machine learning (e.g., Q-learning). The server device 220 may determine an execution policy for each application, and may provide the same to the electronic device 210. The server device 220 may be a server operated by the manufacturer of the electronic device 210.

According to various embodiments, the server device 220 may receive an execution policy for each application which is determined by each electronic device 210. For example, the electronic device 210 may determine an optimal parameter (e.g., a clock speed, an FPS, or the like) associated with the heat generation of the electronic device 210 and a game performance via machine learning, and may provide the determined parameters to the server device 220. The server device may collect an application execution policy transmitted from the electronic device 210, may take an average of the collected application execution policies, and may determine an optimal parameter (e.g., a clock speed, an FPS, or the like) for each application. The server device may map an optimal parameter to the device type (e.g., a model name, the specifications of a processor, or the like) of each electronic device 210 and an application using the collected values, may store and update the same, and may provide information stored in the corresponding electronic device 210. The server device 220 may transmit the execution policy to the electronic device 210 at a set time. If the electronic device 210 transmits the device type of the electronic device 210 and the list of installed applications, the server device 220 may transmit an execution policy that matches the corresponding request to the electronic device 210.

According to various embodiments, if an erroneous situation (e.g., application shutdown, excessive heat generation, or the like) occurs in association with the execution of an application, the electronic device 210 may provide related information to the server device 220. If the server device 220 receives the information from the electronic device 210, the server device 220 may transmit an execution policy to electronic devices, which are the same type of electronic devices (e.g., the same model, executing the same application) as the corresponding electronic device. The execution policy may include a relatively low clock speed and the maximum current. In this instance, the electronic device does not take into consideration the state of the electronic device such as the current temperature (e.g., an internal temperature, a surface temperature, or the like), and may decrease a clock speed and a current value provided to the processor according to the execution policy received from the server device 220.

Figure 3:
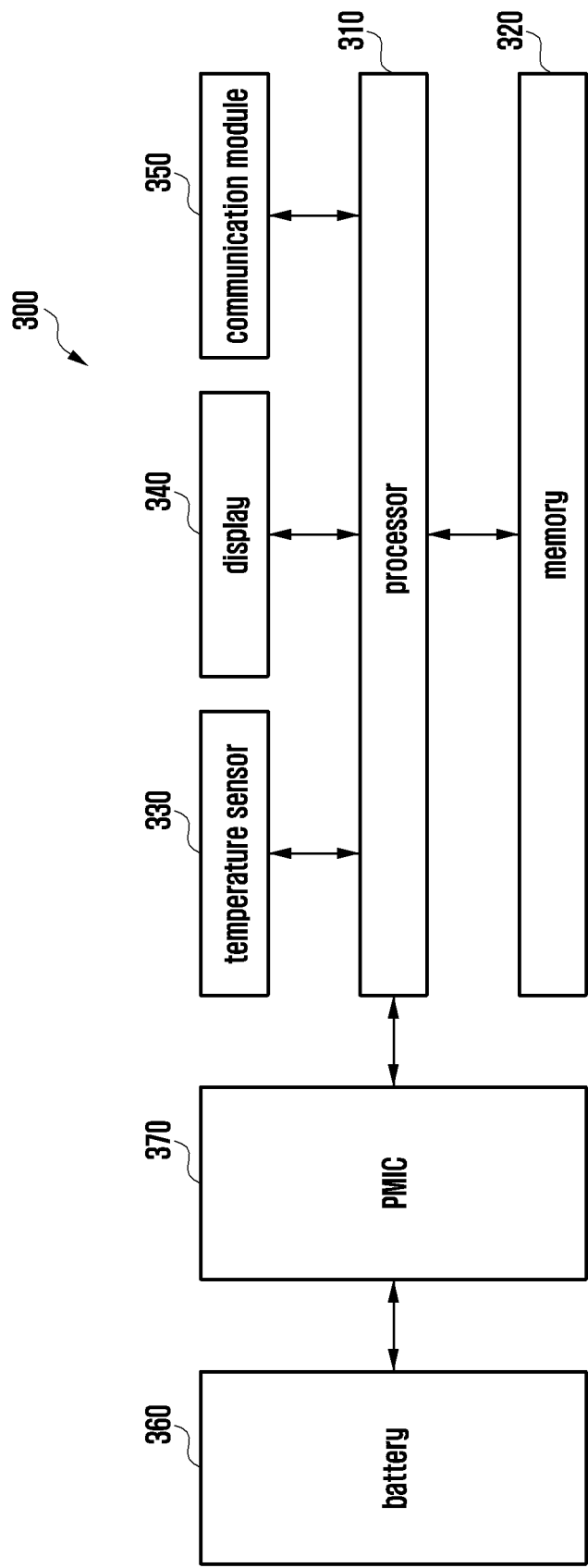
FIG. 3 is a block diagram illustrating an electronic device according to various embodiments.

FIG. 3 is a block diagram illustrating an electronic device according to various embodiments.

Referring to FIG. 3, an electronic device 300 (e.g., the electronic device 101 of FIG. 1) according to various embodiments may include a processor 310 (e.g., the processor 120 of FIG. 1), a memory 320 (e.g., the memory 130 of FIG. 1), a display 340 (e.g., the display device 160 of FIG. 1), a temperature sensor 330 (e.g., the sensor module 176 of FIG. 1), a communication module 350 (e.g., the communication module 190 of FIG. 1), a battery 360 (e.g., the battery 189 of FIG. 1), and a PMIC 370 (e.g., the power management module 188 of FIG. 1). The electronic device 300 may include at least a part of the configuration and/or functions of the electronic device 101 of FIG. 1 and/or the electronic device 210 of FIG. 2.

According to various embodiments, the display 340 may display various images. For example, the display 340 may display an image generated by an application (e.g., a game application) executed by the processor 310. The display 340 may be implemented any one of a liquid crystal display (LCD), a light-emitting diode (LED) display, an organic light-emitting diode (OLED) display, a microelectromechanical systems (MEMS) display, or an electronic paper display, but is not limited thereto. The display 340 may include at least a part of the configuration and/or functions of the display device 160 of FIG. 1.

According to various embodiments, the communication module 350 may include a software and/or hardware module for communicating with a network (e.g., the network 230 of FIG. 2) or an external device (e.g., the server device 220 of FIG. 2) in a wireless manner, and may include at least a part of the configuration and/or functions of the wireless communication module 192 of FIG. 1. The communication module 350 may support cellular communication (e.g., LTE and the like) and wireless LAN communication (e.g., Wi-Fi and the like), may transmit data received from the processor 310 to another external device (e.g., the server device 220 of FIG. 2) over a network, or may provide data received from another external device to the processor 310.

According to various embodiments, the battery 360 may supply power to at least one element (e.g., the processor 310, the memory 320, and the like) of the electronic device 300.

According to various embodiments, the power management integrated circuit (PMIC) 370 may perform control so as to supply power to other elements of the electronic device 300. For example, the PMIC 370 may provide, to the processor 310, power (or a current) determined according to an application execution policy (e.g., a clock speed) determined by the processor 310.

According to various embodiments, the temperature sensor 330 may be a configuration for measuring the internal temperature of the electronic device 300. The temperature sensor 330 may include a thermistor, and the thermistor may be disposed in the battery 360 or a main printed circuit board (PCB) in which the processor 310 and the memory 320 are mounted. The processor 310 may measure the internal temperature of the electronic device 300 using the temperature sensor 330, and may identify the external temperature of the electronic device 300 (or the ambient temperature of the electronic device 300) based on the measurement value of the temperature sensor 330 or the temperature of the current location obtained from the outside (e.g., a weather forecast provision service).

According to various embodiments, the memory 320 may be a publicly known volatile memory and non-volatile memory, but a detailed implemented example is not limited thereto. The memory 320 may include at least a part of the configuration and/or functions of the display device 130 of FIG. 1. In addition, the memory 320 may store at least a part of the program 140 of FIG. 1.

The memory 320 may operatively, functionally, and/or electrically be connected to the processor 310, and may store various instructions implemented in the processor 310. The instructions may include control commands, such as arithmetic and logic operation, data transfer, input and output, and the like, which may be recognized by the processor 310.

According to various embodiments, at least a part of the configuration and/or functions of the processor 120 of FIG. 1 may be included as a configuration capable of performing an operation and data processing associated with controlling and/or communication of each element of the electronic device 300. The processor 310 may operatively and/or electrically be connected to internal elements of the electronic device 300, such as the memory 320, the display 340, the temperature sensor 330, the communication module 350, the PMIC 370, and the like.

Although the operation and data processing functions that the processor 310 is capable of implementing in the electronic device 300 are not limited, various embodiments for detecting the external temperature of the electronic device 300 and determining a clock speed based thereon will be described in the disclosure. Operations of the processor 310 to be described below may be performed by loading instructions stored in the memory 320.

According to various embodiments, the processor 310 may select any one of a plurality of clock speeds according to a designated clock governor, and may execute an application using the selected clock speed. Also, the electronic device 300 may change a clock speed by request from an application while the application is being executed.

According to various embodiments, the processor 310 may receive power corresponding to a selected clock speed from the battery 360 so that an application is executed at the selected clock speed.

According to various embodiments, the processor 310 may identify an external temperature when executing an application, and may determine, based on the identified external temperature, a clock speed to be used for executing the application. According to various embodiments, if the external temperature falls within a first designated temperature range (e.g., approximately 0° C. or higher), the electronic device 300 may execute an application using one clock speed selected from among a plurality of clock speeds according to a designated clock governor. In addition, if the external temperature falls within a second designated temperature range (e.g., less than approximately 0), the electronic device 300 may execute the application using one selected from among the plurality of clock speeds, excluding some fast clock speeds, according to the designated clock governor. For example, in the case in which the external temperature falls within the second designated temperature range, although a clock speed is determined by the clock governor, if the determined clock speed is greater than a predetermined speed (or a threshold speed), the electronic device 300 may not use the determined clock speed, and may execute the application using a clock speed lower than the determined clock speed.

According to various embodiments, the electronic device 300 may select a third clock speed obtained by applying a first weight and a second weight, which are determined based on the external temperature, to a first clock speed and a second clock speed related to the execution of an application. Here, when determining the third clock speed, the first weight may be a weight to be applied to the first clock speed and the second weight may be a value determined for the second clock speed.

The second clock speed is a value lower than the first clock speed, and the first weight may be configured to have a lower value as an external temperature becomes lower. Accordingly, as the external temperature becomes lower, the third clock speed may be determined to be a relatively lower value.

According to various embodiments, the electronic device 300 may execute an application at the third clock speed, or may set the maximum clock speed to be less than or equal to the third clock speed although a clock speed that is higher than the third clock speed is selected according to a clock governor.

According to various embodiments, the first clock speed and the second clock speed may be determined via machine learning (e.g., Q-learning) that uses at least one parameter as a reward. For example, Q-learning may be a learning method that is used for optimizing the temperature of the electronic device 300 and the performance of an application, and may be performed by the electronic device 300 or a server device. The at least one parameter may further include at least one of a current or power provided to the processor 310, a frame per second (FPS), and the internal temperature of the electronic device 300. Among them, the FPS may have larger-the-better characteristics and the internal temperature has smaller-the-better characteristics.

The electronic device 300 (or a server device) may determine the first clock speed by applying a weight to a parameter (e.g., an FPS) related to the performance of the electronic device 300 among the various parameters, and may determine the second clock speed by applying a weight to a parameter (e.g., an internal temperature) related to the stability of the electronic device 300.

According to various embodiments, the first clock speed and the second clock speed may be determined for each application. For example, only for a designated application such as a game application, the first clock speed and the second clock speed may be determined via Q-learning.

According to various embodiments, the processor 310 may identify the external temperature (or ambient temperature) of the electronic device 300 based on a first temperature (or internal temperature) measured by the temperature sensor 330 and a second temperature calculated using machine learning (e.g., a linear regression function).

According to various embodiments, when executing a designated application at a reference temperature (e.g., 15° C.), the processor 310 (or a server device) may calculate the temperature value of the temperature sensor 330 which is expected via linear regression analysis performed based on heat generation corresponding to the amount of operation of the processor 310, and may determine the calculated temperature value to be a second temperature. The processor 310 (or server device) may determine a second temperature for each application, and may determine second temperatures at a plurality of reference temperatures (e.g., approximately −5° C., 15° C., and 35° C.).

The processor 310 may determine the external temperature of the electronic device 300 by adding a reference temperature and a value, obtained by subtracting the second temperature from the first temperature measured by the temperature sensor 330 in real time while the application is executed. In this instance, the processor 310 may select a second temperature that is the closest to the measured first temperature among a plurality of second temperatures corresponding to the plurality of reference temperatures. For example, if the first temperature measured in real time is approximately 0° C., the processor 310 may select approximately −5° C., which is the closest to 0° C., as the reference temperature, may identify a second temperature corresponding to the reference temperature of approximately −5° C., and may determine the external temperature of the electronic device 300 by adding the reference temperature and a value, obtained by subtracting the second temperature from the first temperature which is approximately 0° C.

According to various embodiments, the processor 310 may determine an application execution policy based on the current location of the electronic device 300. For example, the processor 310 may use different application execution policies depending on whether the electronic device 300 is located inside or outside a room. The processor 310 may identify whether the electronic device is present inside or outside a room based on the temperature of the current location, identified from the measurement value of the temperature sensor 300 or obtained from the outside (e.g., a weather forecast provision service).

According to various embodiments, in determining a clock speed to be used when executing an application, the electronic device 300 may use a plurality of execution policies. If an external temperature is less than a designated first temperature (e.g., approximately 42° C.), the processor 310 may determine, according to a first execution policy, a clock speed to be used when executing an application. In addition, if the external temperature is greater than or equal to the designated first temperature, the processor 310 may determine, according to a second execution policy, a clock speed to be used when executing an application. According to various embodiments, the first execution policy and the second execution policy are determined via machine learning (e.g., Q-learning), and the machine learning may be performed by the electronic device 300, another electronic device, or a server device.

For example, the first execution policy may be a policy for adjusting a clock speed based on a variation in temperature (e.g., the internal temperature or external temperature of the electronic device). According to the first execution policy, although the current temperature is high, if a variation in temperature is a negative number (if temperature decreases), a clock speed is increased. Although the current temperature is low, if a variation in temperature is a positive number (if temperature increases), a clock speed may be decreased. The first execution policy may include the amount of adjustment in a clock speed based on a variation in temperature and a temperature section.

The second execution policy may be a policy of decreasing a clock speed based on temperature. The second execution policy is used when the electronic device has a high temperature (e.g., in a state of having a temperature greater than or equal to a first temperature (e.g., approximately 42° C.)), the processor 310 may decrease a clock speed based on the current temperature. The second execution policy is a policy for preventing overheating of the electronic device and thus, a parameter (e.g., an FPS) related to the performance of an application may become less important.

According to various embodiments, if the temperature is greater than a second temperature (e.g., 46° C.), which is higher than the first temperature, the electronic device 300 may terminate an application that is being executed.

According to various embodiments, further based on a mode determined by a user input, the electronic device 300 may determine a clock speed to be used for executing an application. For example, according to a mode selected by a user, the electronic device 300 may decrease or increase a clock speed selected according to the clock governor, by a designated value.

The electronic device 300 may provide, on the display 340, a graphic user interface used for determining the mode. For example, if the user selects a performance precedence mode via the graphic user interface, the electronic device may execute an application by increasing the selected clock speed by a designated value. If the user selects a heat generation precedence mode, the electronic device may execute an application by decreasing the selected clock speed by a designated value.

FIG. 4 is a block diagram illustrating a software module of an electronic device and a server device according to various embodiments.

The illustrated software modules may be implemented by the processor (e.g., the processor 310 of FIG. 3) of an electronic device 410 (e.g., the electronic device 300 of FIG. 3) and the processor of a server device 420 (e.g., the server device 220 of FIG. 2), respectively.

According to various embodiments, the server device 420 may include a learning module 422, an application execution policy determination module 424, and a communication module.

The communication module 428 may include programs for performing communication with a plurality of electronic devices.

The learning module 422 may perform machine learning in order to optimize the performance of an application and the temperature of the electronic device 410 via machine learning (e.g., Q-learning). For example, the learning module 422 may determine values for optimizing parameters, such as the clock speed of a processor (e.g., an application processor, a CPU, a GPU) of the electronic device 410, a current or power provided to a processor, a frame per second (FPS), the internal temperature of the electronic device 410, and the like, via machine learning (e.g., Q-learning), for each electronic device 410 and for each application. The parameters determined by the learning module 422 may be provided to the application execution policy determination module 424.

The application execution policy determination module 424 may determine the execution policy of each application for each electronic device 410. Here, the execution policy may include at least one parameter determined by the learning module 422. The determined execution policy may be provided to the electronic device 410.

According to various embodiments, the electronic device 410 may include an application execution module 412, an application execution policy determination module 414, a temperature measurement module 416, and a communication module 418.

The application execution module 412 may execute an application (e.g., a game application), and may identify information associated with the executed application.

The temperature measurement module 416 may determine the internal temperature of the electronic device 410 measured by a temperature sensor (e.g., a battery thermistor), and the external temperature of the electronic device 410. The temperature measurement module 416 may identify the external temperature (or ambient temperature) of the electronic device 410 based on a first temperature (or internal temperature) measured by the temperature sensor and a second temperature calculated using a linear regression function.

The communication module 418 may include programs for performing communication with the server device 420.

The application execution policy determination module 414 may identify an execution policy determined by the server device 420. According to various embodiments, the electronic device 410 may directly perform machine learning in order to optimize the performance of an application and the temperature of the electronic device 410 via machine learning (e.g., Q-learning).

When executing an application, the application execution policy determination module 414 may identify an execution policy (e.g., a clock speed, an FPS, and the like) for the corresponding application, and may execute the application according to the identified execution policy.

Figure 5A:
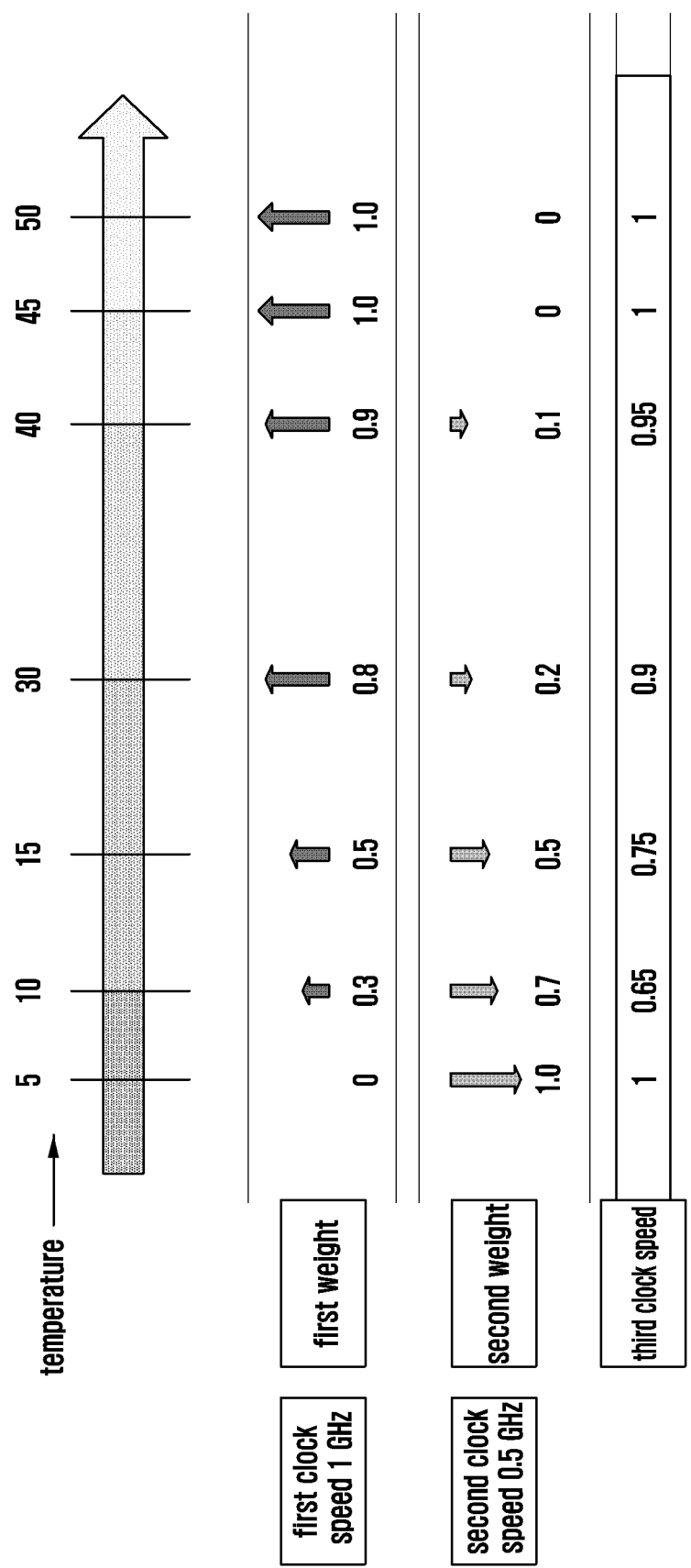
FIG. 5A is a diagram illustrating an example of determining a clock speed by applying a weight based on an external temperature according to various embodiments.

FIG. 5A is a diagram illustrating an example of determining a clock speed by applying a weight based on an external temperature according to various embodiments.

Referring to FIG. 5A, a processor (e.g., the processor 310 of FIG. 3) may identify a first clock speed and a second clock speed. Here, the first clock speed and the second clock speed are determined by Q-learning performed by an electronic device or a server device (e.g., the learning module 422 of the server device 420 of FIG. 4). The electronic device (or the server device) may determine the first clock speed by applying a weight to a parameter (e.g., an FPS) related to the performance of the electronic device among the various parameters, and may determine the second clock speed by applying a weight to a parameter (e.g., an internal temperature) related to the stability of the electronic device. For example, the first clock speed may be the recommended specifications for executing an application, and the second clock speed may be the minimum specifications.

According to various embodiments, the electronic device may select a third clock speed obtained by applying a first weight and a second weight, which are determined based on an external temperature, to the first clock speed and the second clock speed. Here, when determining the third clock speed, the first weight may be a weight to be applied to the first clock speed and the second weight may be a value determined for the second clock speed.

The second clock speed is a value lower than the first clock speed, and the first weight may be configured to have a lower value as the external temperature becomes lower. Accordingly, when the external temperature becomes lower, the third clock speed may be determined to be a relatively lower value.

Referring to FIG. 5A, via machine learning (e.g., Q-learning), the first clock speed may be determined to be approximately 1 GHz, and the second clock speed may be determined to be approximately 0.5 GHz. The electronic device may identify the external temperature of the electronic device, and may determine the third clock speed to be a value falling within the range between 0.5 GHz and 1 GHz based on the identified external temperature. For example, if the measured external temperature is approximately 10° C., the first weight is 0.3 and the second weight is 0.7, and thus, the third clock speed may be determined to be approximately 0.65 GHz. In addition, if the external temperature increases by approximately 15 as an application is executed, the first weight is 0.5 and the second weight is 0.5, and thus, the third clock speed may be determined to be approximately 0.75 GHz.

According to various embodiments, the electronic device may execute an application at the third clock speed, or may set the maximum clock speed to be less than or equal to the third clock speed although a clock speed that is higher than the third clock speed is selected according to a clock governor.

According to various embodiments, if the external temperature falls within a second designated temperature range (e.g., less than 0° C.), the electronic device may select one clock speed from among a plurality of clock speeds, excluding some fast clock speeds, so as to execute a designated application at the selected clock speed.

The first clock speed, the second clock speed, the first weight, and the second weight in FIG. 5A are merely examples, and may be set to different values.

Figure 5B:
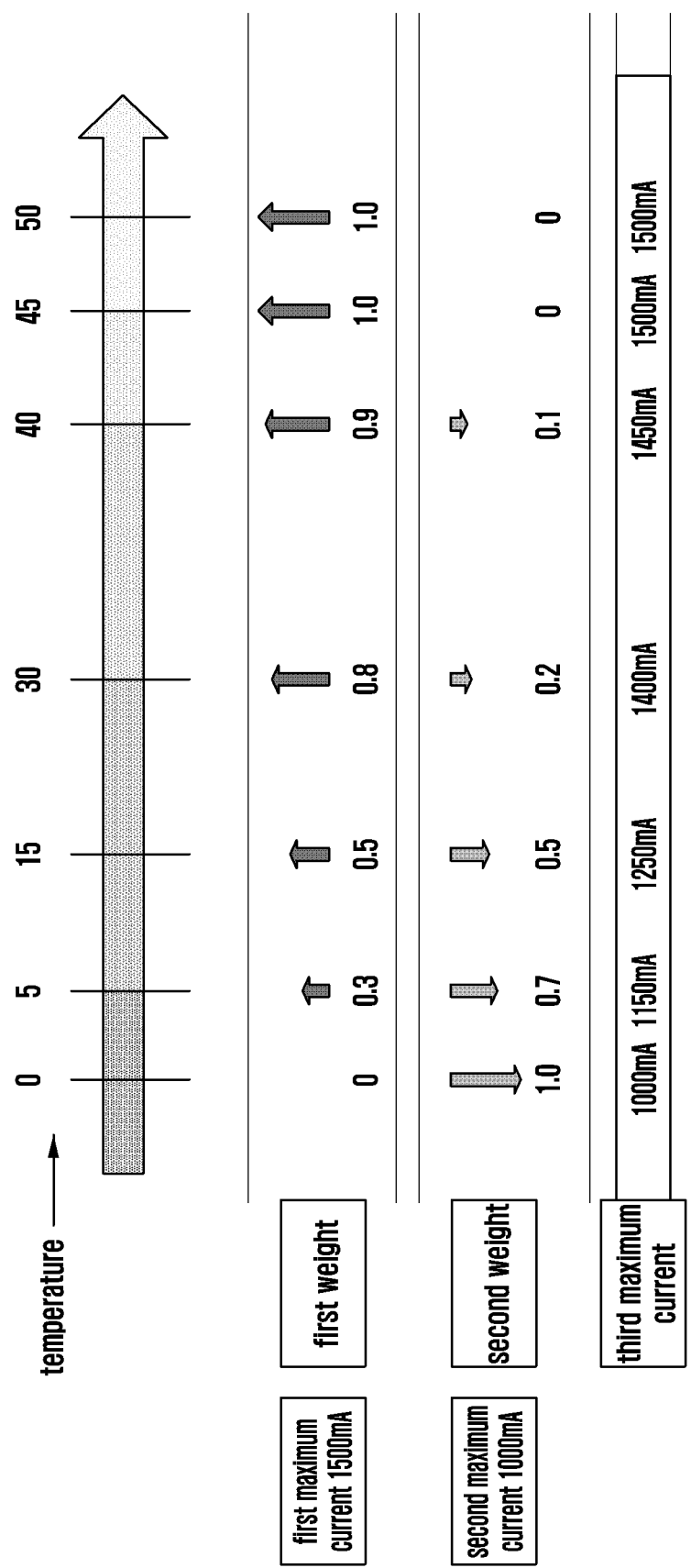
FIG. 5B is a diagram illustrating an example of determining the maximum current by applying a weight based on an external temperature according to various embodiments.

FIG. 5B is a diagram illustrating an example of determining the maximum current by applying a weight based on an external temperature according to various embodiments.

Referring to FIG. 5B, an electronic device (e.g., the processor 310 of FIG. 3) may identify a first maximum current and a second maximum current. Here, each of the first maximum current and the second maximum current may be the maximum value of a current value output from a battery to a processor. The first maximum current and the second maximum current are determined by machine learning (e.g., Q-learning) performed by an electronic device or a server device. The electronic device (or the server device) may determine the first maximum current by applying a weight to a parameter (e.g., an FPS) related to the performance of the electronic device among the various parameters, and may determine the second maximum current by applying a weight to a parameter (e.g., an internal temperature) related to the stability of the electronic device.

Referring to FIG. 5B, via machine learning (e.g., Q-learning), the first maximum current may be determined to be approximately 1500 mA, and the second maximum current may be determined to be approximately 1000 mA. The electronic device may identify the external temperature of the electronic device, and may determine a third maximum current to be a value falling within the range between 1000 mA and 1500 mA based on the identified external temperature. For example, if the measured external temperature is approximately 5, the first weight is 0.3 and the second weight is 0.7, and thus, the third maximum current may be determined to be approximately 1150 mA. In addition, if the external temperature increases by approximately 15 as an application is executed, the first weight is 0.5 and the second weight is 0.5, and thus, the third maximum current may be determined to be approximately 1250 mA.

According to various embodiments, when executing an application, the electronic device may set the maximum value of a current provided from the battery to the processor, based on the third maximum current.

Figure 5C:
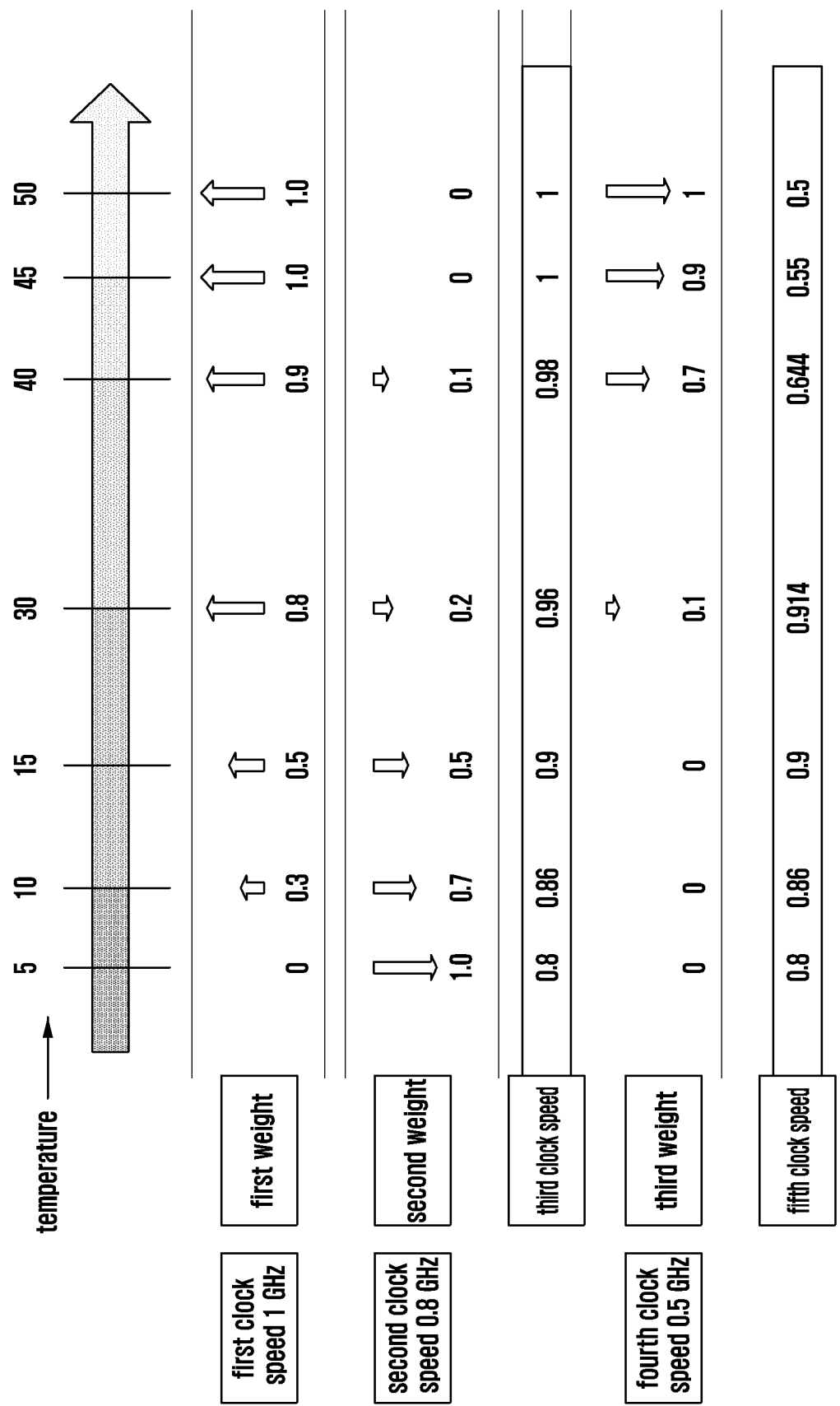
FIG. 5C is a diagram illustrating an example of determining a clock speed by applying a weight based on an external temperature according to various embodiments.

FIG. 5C is a diagram illustrating an example of determining a clock speed by applying a weight based on an external temperature according to various embodiments.

Compared to the embodiment of FIG. 5A, according to the embodiment of FIG. 5C, a target clock speed to be used when executing an application may be determined by additionally using a fourth clock speed and a third weight, in order to restrict heat generation of an electronic device in a high temperature state.

Referring to FIG. 5C, a processor (e.g., the processor 310 of FIG. 3) may identify a first clock speed and a second clock speed. According to various embodiments, the electronic device may select a third clock speed obtained by applying a first weight and a second weight, which are determined based on an external temperature, to the first clock speed and the second clock speed. Here, when determining the third clock speed, the first weight may be a weight to be applied to the first clock speed and the second weight may be a value determined for the second clock speed.

Referring to FIG. 5C, via machine learning (e.g., Q-learning), the first clock speed may be determined to be approximately 1 GHz, and the second clock speed may be determined to be approximately 0.8 GHz. The electronic device may identify the external temperature of the electronic device, and may determine the third clock speed to be a value falling within the range between 0.8 GHz and 1 GHz based on the identified external temperature. For example, if the measured external temperature is approximately 10° C., the first weight is 0.3 and the second weight is 0.7, and thus, the third clock speed may be determined to be approximately 0.86 GHz. In addition, if the external temperature increases by approximately 15 as an application is executed, the first weight is 0.5 and the second weight is 0.5, and thus, the third clock speed may be determined to be approximately 0.9 GHz.

According to various embodiments, using the fourth clock speed and the third weight in consideration of heat generated outside, the electronic device may determine the final clock speed (e.g., a fifth clock speed) to be used when executing an application.

The fourth clock speed is a value determined via machine learning, and may be the maximum value of a clock speed which does not cause further heat generation of the electronic device. The fourth clock speed may be a value lower than the first clock speed and the second clock speed. Referring to FIG. 5C, the fourth clock speed may be determined to be 0.5 GHz, and a weight may be set for each temperature. The third weight to be applied to the fourth clock speed is to restrict heat generation of the electronic device, and thus, the third value may have a higher value as the temperature becomes higher.

For example, if the measured external temperature is approximately 5° C., 10° C., and 15° C., the third weight is 0, and thus, the third clock speed at each temperature, that is, 0.8 GHz, 0.86 GHz, and 0.9 GHz may be determined to be a fifth clock speed. If the measured external temperature is approximately 30° C., the third weight is 0.1, and thus, the fifth clock speed may be determined to be 0.914 GHz by applying a weight of 0.9 and a weight of 0.1 to the third clock speed of 0.9 GHz and the fourth clock speed of 0.5

GHz, respectively. In addition, if the temperature is greater than or equal to approximately 50° C., the fourth weight is 1, and thus, the fifth clock speed may be determined to be 0.5 GHz which is the fourth clock speed. In this instance, the processor may operate at the maximum clock speed at approximately 35° C.

According to various embodiments, the electronic device may execute an application at the fifth clock speed, or may set the maximum clock speed to be less than or equal to the fifth clock speed although a clock speed that is higher than the fifth clock speed is selected according to a clock governor.

According to various embodiments, if the measured temperature (external temperature or internal temperature) is greater than or equal to a predetermined temperature, the electronic device may terminate execution of an application.

The first clock speed, the second clock speed, the fourth clock speed, the first weight, the second weight, and the third weight in FIG. 5C are merely examples, and may be set to different values.

According to various embodiments, in calculating the maximum current provided from a battery to a processor (e.g., the embodiment of FIG. 5B), the electronic device may calculate a fifth maximum current capable of restricting heat generation using a fourth maximum current and a third weight.

Figure 6:
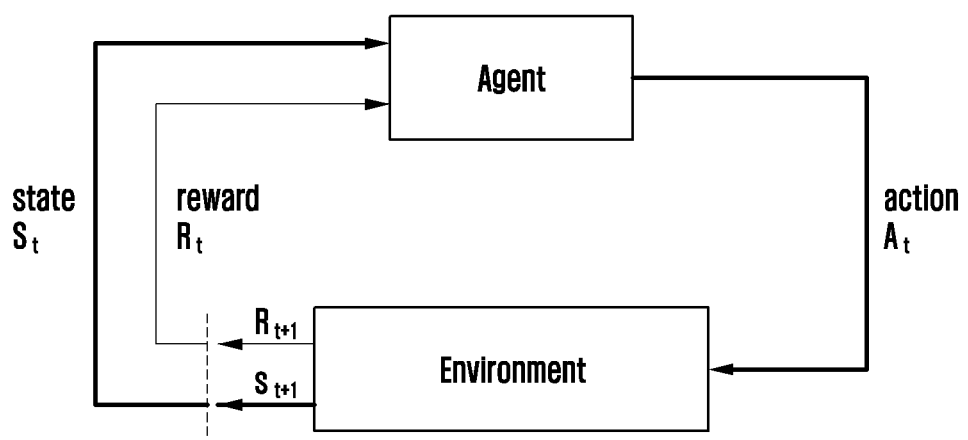
FIG. 6 is a diagram illustrating Q-learning according to various embodiments.

FIG. 6 is a diagram illustrating Q-learning, which is an example of machine learning, according to various embodiments.

According to various embodiments, the electronic device (e.g., the processor 310 of FIG. 3) may determine a first clock speed and a second clock speed using Q-learning that uses at least one parameter, including a clock speed, as a reward. Here, the at least one parameter may further include at least one of a current or power provided to a processor, an FPS, and the temperature of the electronic device.

The electronic device may use Q-learning as a scheme of optimizing the performance of an application and heat generation of the electronic device. Q-learning takes an action for a state according to an appropriate heuristic method, provides a + or − reward, and proceeds with learning in a way of maximizing the value of the reward.

Referring to FIG. 6, the electronic device may increase a clock speed by taking an action under the current state. Increasing the clock speed may affect other parameters such as the temperature of the electronic device, an FPS, and the like, and the related parameters are transferred to an agent as a state, and parameter values changed by the action may be transferred to the agent as a reward. The electronic device may repeatedly perform the operation and may identify the optimal value of each parameter.

According to various embodiments, when executing Q-learning, the electronic device may determine a first result value (e.g., a first clock speed) by applying a weight to a parameter (e.g., an FPS) related to the performance of the electronic device, and may determine a second result value (e.g., a second clock speed) by applying a weight to a parameter (e.g., an internal temperature) related to stability of the electronic device.

According to various embodiments, Q-learning may be performed by a server device (e.g., the learning module 422 of the server device 420 of FIG. 4), and an execution result value may be provided from the server device to each electronic device.

Figure 7A:
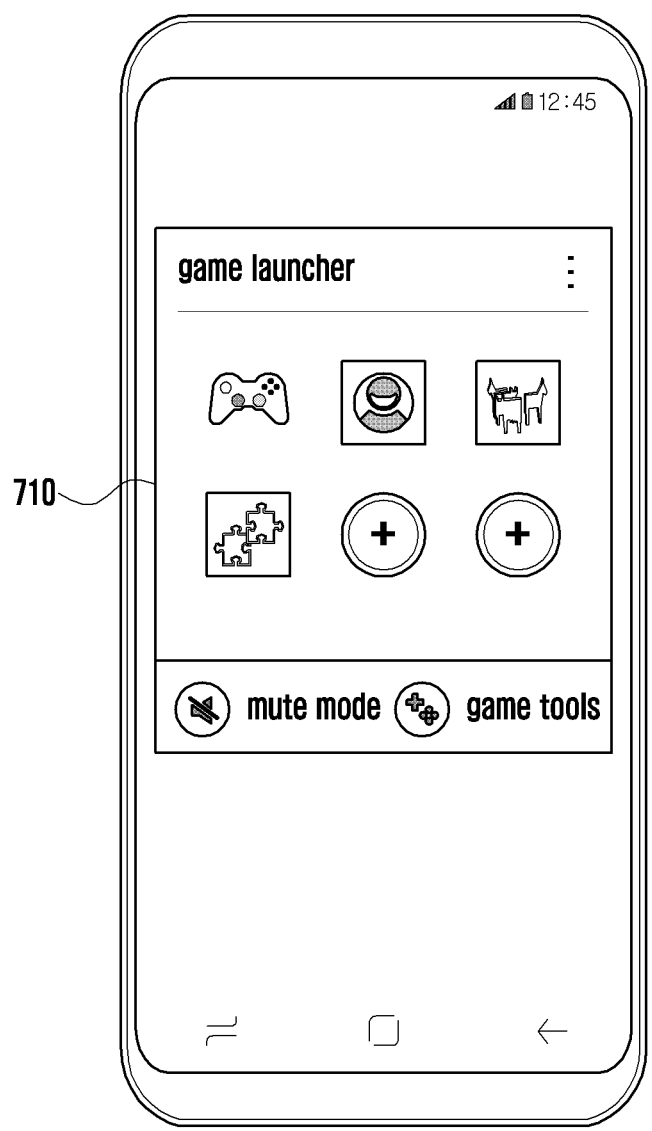
FIGS. 7A and 7B are diagrams illustrating graphic user interfaces used for determining an operation mode of an application according to various embodiments.
Figure 7B:
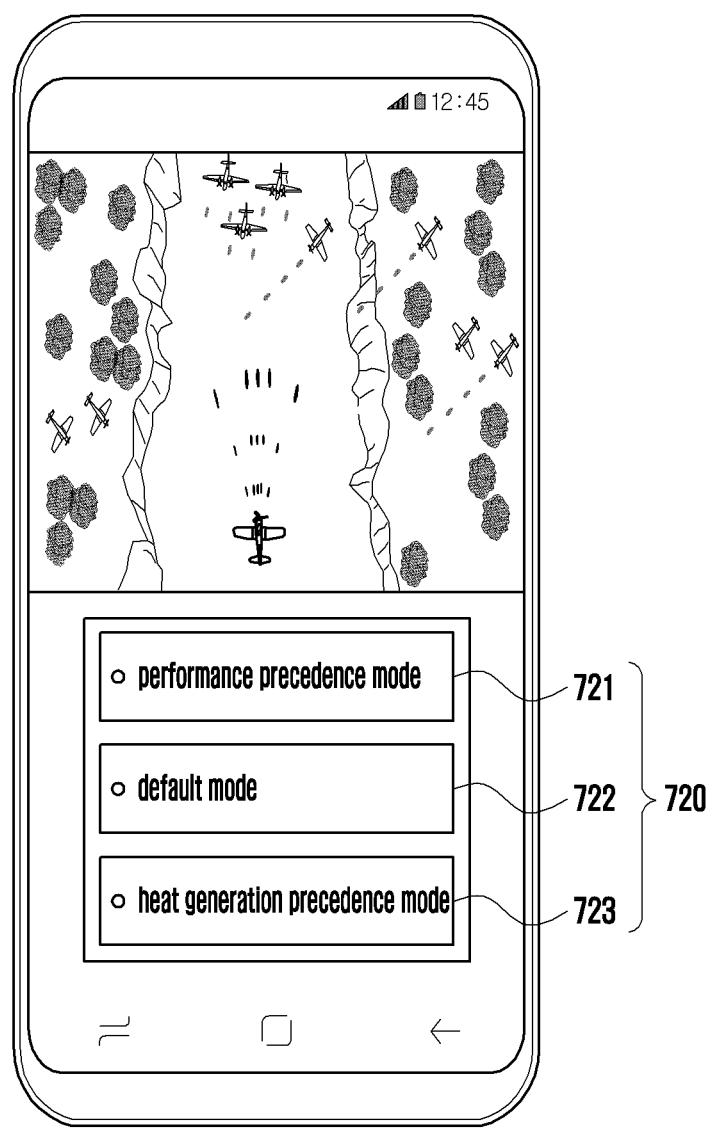

FIGS. 7A and 7B are diagrams illustrating graphic user interfaces used for determining an operation mode of an application according to various embodiments.

According to various embodiments, based on a mode determined by a user input, an electronic device (e.g., the processor 310 of FIG. 3) may determine a clock speed to be used for executing a designated application. For example, according to a mode selected by a user, the electronic device may decrease or increase, by a designated value, the clock speed selected according to a clock governor and use the same.

The electronic device may provide a graphic user interface for determining the mode on a display (e.g., the display 340 of FIG. 3). Referring to FIG. 7A, the electronic device may display, on a display, at least one icon 710 capable of setting a mode. For example, the electronic device may display icons of installed game applications.

Referring to FIG. 7B, the electronic device may display a menu 720 capable of setting an operation mode for a selected application. For example, the operation mode may include a default mode 722, a heat generation precedence mode 723, and a performance precedence mode 721. The default mode 722 may be a mode in which an electronic device executes an application at a clock speed determined according to an application execution policy. The performance precedence mode 721 may be a mode for executing an application at a clock speed a designated value higher than the clock speed selected according to the execution policy. The heat generation precedence mode 723 may be a mode for executing an application at a clock speed a designated value lower than the clock speed selected according to the execution policy, in order to prevent heat generation of the electronic device.

According to various embodiments, the electronic device may determine a target current provided from the processor according the selected operation mode.

Figure 8A:
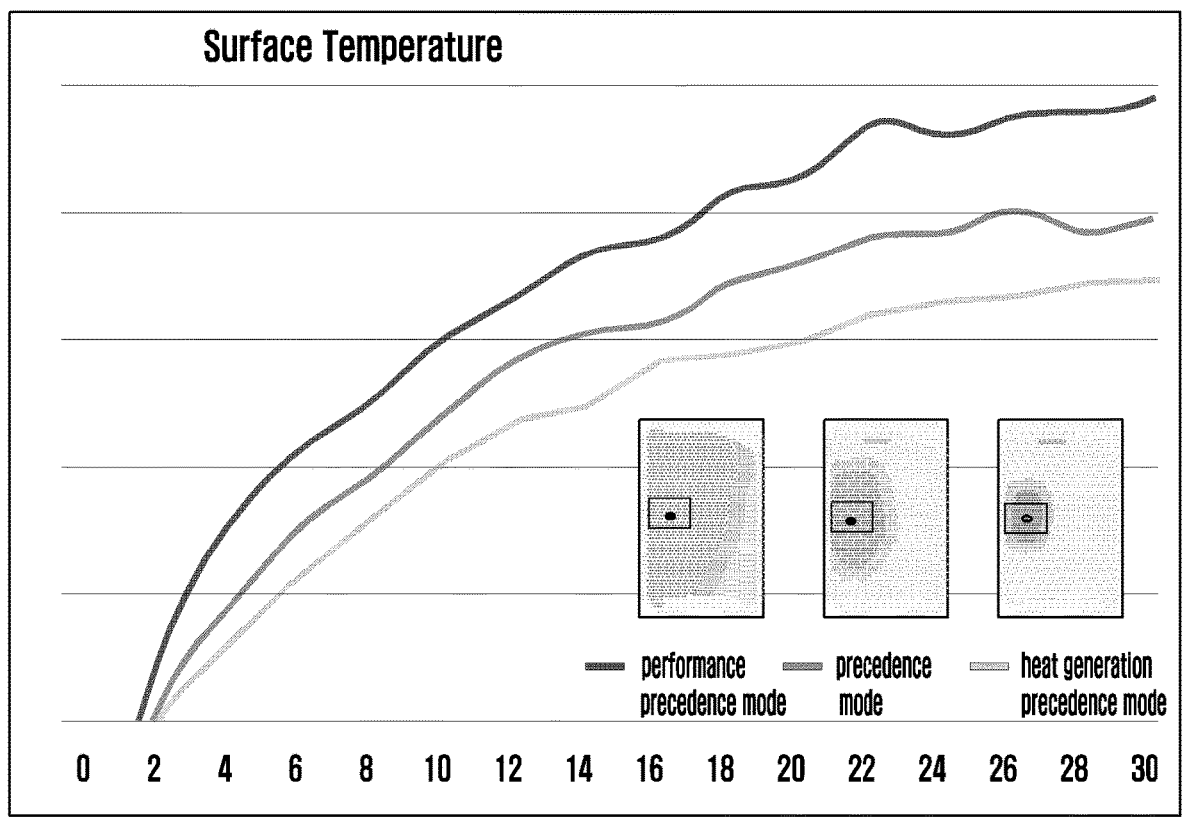
FIGS. 8A and 8B are diagrams illustrating a surface temperature and an FPS for each operation mode of an application according to various embodiments.
Figure 8B:
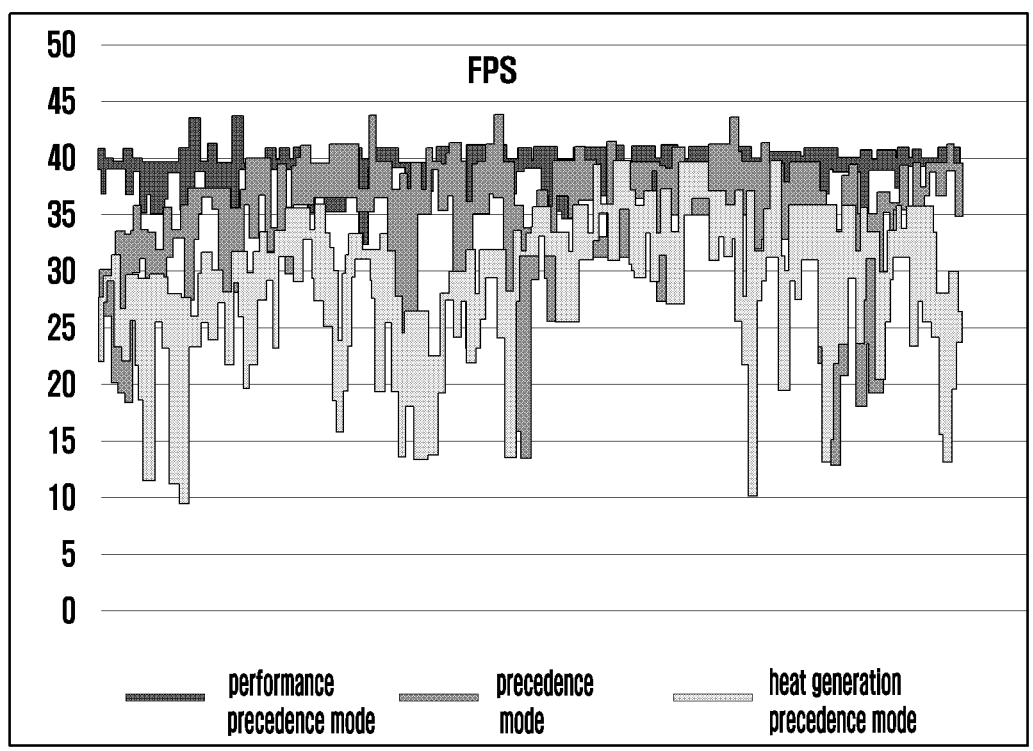

FIGS. 8A and 8B are diagrams illustrating a surface temperature and an FPS for each operation mode of an application according to various embodiments.

FIG. 8A shows the internal temperature (or surface temperature) of an electronic device over time while an application is executed, in each of the performance precedence mode, default mode, and heat generation precedence mode. As illustrated in the drawing, as the application is executed, the internal temperature of the electronic device increases. In this instance, it is recognized that heat generation is low in order of the heat preference mode, the default mode, and the performance precedence mode.

FIG. 8B shows the FPS of an application over time while an application is executed, in each of the performance precedence mode, default mode, and heat generation precedence mode. As illustrated in the drawing, a high FPS is maintained as it is in the performance precedence mode. In the heat generation precedence mode, an FPS may be set to a relatively lower value based on a variation in temperature of the electronic device.

The electronic device 300 according to various embodiments may include the temperature sensor 330, a display, and the processor 310 configured to operate using a clock speed selected from among a plurality of clock speeds, and the processor 310 is configured to: execute a designated application using one clock speed selected from among the plurality of clock speeds; identify an external temperature using the temperature sensor 330 during at least a partial time while the designated application is being executed; if the external temperature falls within a first designated temperature range, execute the designated application using a clock speed selected from among the plurality of clock speeds according to a designated clock governor; and if the external temperature falls within a second designated temperature range which is lower than the first designated temperature, execute the designated application using a clock speed selected from among the plurality of clock speeds, excluding some fast clock speeds, according to the designated clock governor.

According to various embodiments, the processor 310 may be configured to select a third clock speed obtained by applying a first weight and a second weight, determined based at least on the external temperature, to a first clock speed and a second clock speed related to execution of the designated application.

According to various embodiments, if the external temperature falls within the second designated temperature range, the processor 310 may be configured to exclude at least one clock speed that exceeds the third clock speed from among the plurality of clock speeds according to the designated clock governor.

According to various embodiments, the second clock speed is lower than the first clock speed, and the first weight is configured to have a lower value as the external temperature becomes lower.

According to various embodiments, the first clock speed and the second clock speed are determined based on machine learning which uses at least one parameter, including a clock speed, as a reward.

According to various embodiments, the at least one parameter further includes at least one of a current provided to the processor 310, power, a frame per second (FPS) of the designated application or a temperature of the electronic device.

According to various embodiments, the first clock speed and the second clock speed are determined for each application.

According to various embodiments, the electronic device may further include the battery 360, and the processor 310 may be configured to receive power corresponding to the selected clock speed from the battery 360.

According to various embodiments, the processor 310 may be configured to identify the external temperature based on a first temperature measured by the temperature sensor 330 and a second temperature calculated using a linear regression function.

According to various embodiments, the processor 310 may be configured to: select the second temperature which is the closest to the measured first temperature from among a plurality of second temperatures corresponding to a plurality of reference temperatures; and identify the external temperature based on the measured first temperature and the selected second temperature.

According to various embodiments, the electronic device 310 may be configured to determine, further based on a mode determined by a user input, a clock speed to be used for executing the designated application.

According to various embodiments, the designated application may include a game application.

Figure 9:
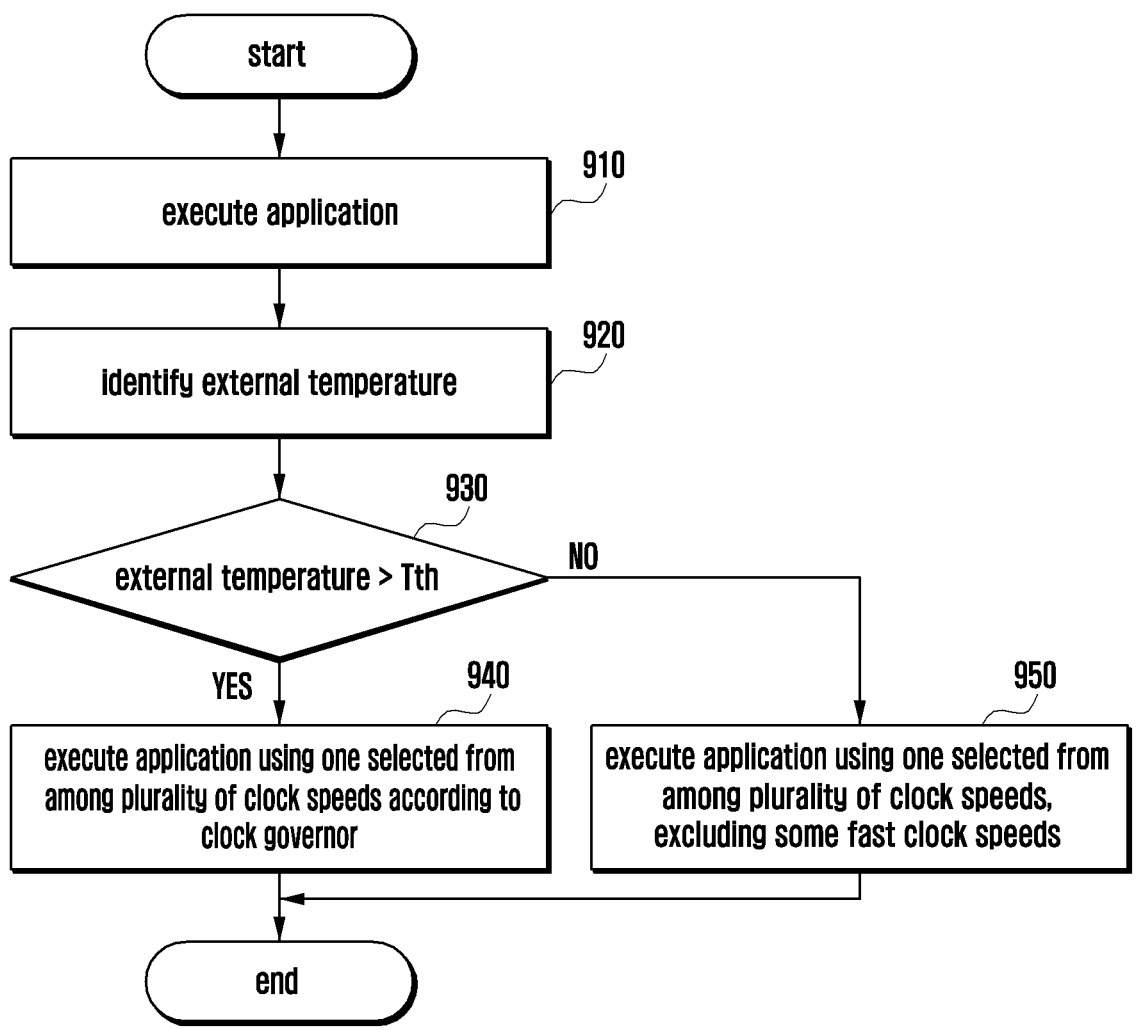
FIG. 9 is a flowchart illustrating a method of controlling the clock speed of an electronic device according to various embodiments.

FIG. 9 is a flowchart illustrating a method of controlling the clock speed of an electronic device according to various embodiments.

The method illustrated in FIG. 9 may be performed by the electronic device 300 of FIG. 3, and the descriptions of the technical features, which have been described above, will be omitted.

In operation 910, the electronic device may detect the execution of an application. For example, the application may be a game application.

In operation 920, the electronic device may identify the external temperature of the electronic device. According to various embodiments, the electronic device may identify the external temperature (or ambient temperature) of the electronic device based on a first temperature (or internal temperature) measured by a temperature sensor and a second temperature calculated using machine learning (e.g., a linear regression function). According to various embodiments, the electronic device or a server device (e.g., the server device 220 of FIG. 2) may learn second temperatures at a plurality of reference temperatures (e.g., approximately −5° C., 15° C., and 35° C.) via machine learning (e.g., a linear regression function). In operation 930, the electronic device may compare the external temperature with a reference value.

When the comparison shows that the external temperature is higher than the reference value (or falls within a first designated temperature range), the electronic device may execute the application using a clock speed selected from among a plurality of clock speeds according to a designated clock governor in operation 940.

When the comparison shows that the external temperature is lower than the reference value (or falls within a second designated temperature range), the electronic device may select one clock speed from among the plurality of clock speeds, excluding some fast clock speeds, according to the designated clock governor, and execute the application using the selected clock speed selected in operation 950. For example, in the case in which the external temperature falls within the second designated temperature range, although a clock speed is determined by the clock governor, if the determined clock speed is greater than a predetermined speed (or a threshold speed), the electronic device may not use the determined clock speed, and may execute the application using a clock speed lower than the determined clock speed.

According to various embodiments, the electronic device may select a third clock speed obtained by applying a first weight and a second weight, which are determined based on the external temperature, to the first clock speed and the second clock speed. Here, when determining the third clock speed, the first weight may be a weight to be applied to the first clock speed and the second weight may be a value determined for the second clock speed. According to various embodiments, the electronic device may execute the application at the third clock speed, or may set the maximum clock speed to be less than or equal to the third clock speed although a clock speed that is higher than the third clock speed is selected according to the clock governor.

A method of controlling the clock speed of the electronic device 300 according to various embodiments may include: executing a designated application; identifying the external temperature of the electronic device 300 during at least a partial time while the designated application is being executed (operation 920); if the external temperature falls within a first designated temperature range, executing the designated application using a clock speed selected from among a plurality of clock speeds according to a designated clock governor (operation 940); and if the external temperature falls within a second designated temperature range which is lower than the first designated temperature, executing the designated application using a clock speed selected from among the plurality of clock speeds, excluding some fast clock speeds, according to the designated clock governor (operation 950).

According to various embodiment, the method may further include selecting a third clock speed obtained by applying a first weight and a second weight, determined at least based on the external temperature, to a first clock speed and a second clock speed related to execution of the designated application.

According to various embodiments, if the external temperature falls within the second designated temperature range, the method may further include excluding at least one clock speed that exceeds the third clock speed from among the plurality of clock speeds according to the designated clock governor.

According to various embodiments, the second clock speed is lower than the first clock speed, and the first weight has a lower value as the external temperature becomes lower.

According to various embodiments, the operation of executing the designated application may include receiving power corresponding to the selected clock speed from the battery 360.

Figure 10:
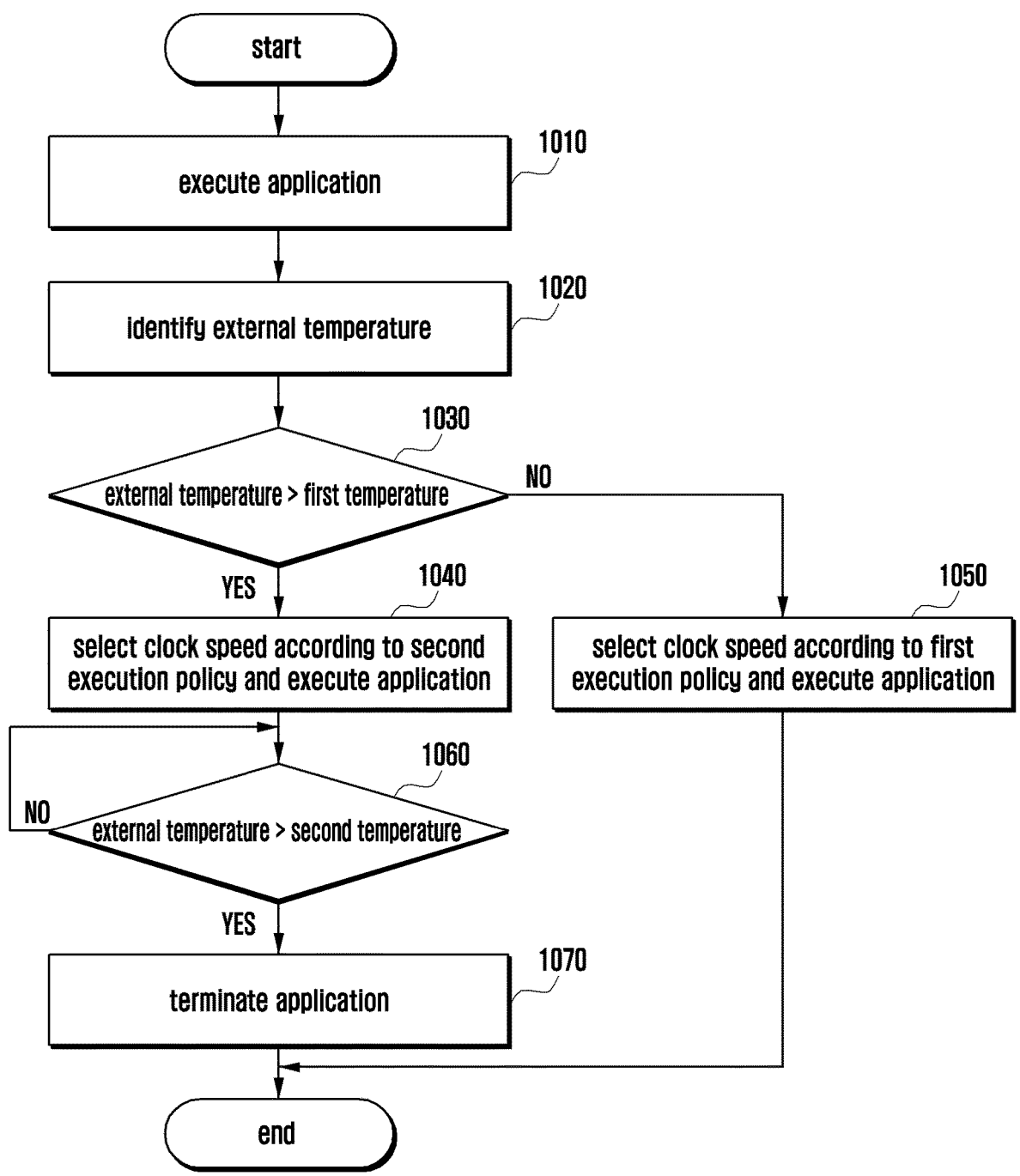

FIG. 10 is a flowchart illustrating a method of controlling the clock speed of an electronic device according to various embodiments.

The method illustrated in FIG. 10 may be performed by the electronic device 300 of FIG. 3, and the descriptions of the technical features, which have been described above, will be omitted.

In operation 1010, the electronic device may detect the execution of an application. For example, the application may be a game application.

In operation 1020, the electronic device may identify the external temperature of the electronic device. According to various embodiments, the electronic device may identify the external temperature (or ambient temperature) of the electronic device based on a first temperature (or internal temperature) measured by a temperature sensor and a second temperature calculated using machine learning (e.g., a linear regression function).

In operation 1030, the electronic device may identify whether the external temperature is greater than or equal to the first temperature. For example, the first temperature may be approximately 42° C., but is not limited thereto.

If a result of the identification in operation 1030 shows that the external temperature is less than the first temperature, the electronic device may determine, according to a first execution policy, a clock speed to be used for executing the application in operation 1050. For example, the first execution policy may be a policy for adjusting a clock speed based on a variation in temperature (e.g., the internal temperature or external temperature of the electronic device). According to the first execution policy, although the current temperature is high, if a variation in temperature is a negative number (if temperature decreases), a clock speed is increased. Although the current temperature is low, if a variation in temperature is a positive number (if temperature increases), a clock speed may be decreased. The first execution policy may include the amount of adjustment in a clock speed based on a variation in temperature and a temperature section.

If the result of the identification in operation 1030 shows that the external temperature is greater than or equal to the first temperature, the electronic device may determine a clock speed to be used for executing the application according to a second execution policy in operation 1040. For example, the second execution policy may be a policy of decreasing a clock speed based on temperature. The second execution policy is used when the electronic device has a high temperature (e.g., in the state of having a temperature greater than or equal to the first temperature (e.g., approximately 42° C.), the processor 310 may decrease the clock speed based on the current temperature. In the second execution policy, a parameter (e.g., an FPS) related to the performance of an application may be less important.

While executing the application according to the second execution policy, the electronic device may identify whether the external temperature is greater than or equal to a second temperature in operation 1060. For example, the second temperature may be approximately 46, but is not limited thereto.

If a result of the identification in operation 1060 shows that the external temperature is greater than or equal to the second temperature, the electronic device may terminate the application that is being executed in operation 1070.

The electronic device 300 according to various embodiments may include the temperature sensor 330, a display, and the processor 310 configured to operate using a clock speed selected from among a plurality of clock speeds. The processor 310 may be configured to: identify an external temperature using the temperature sensor 330; if the external temperature is less than a designated first temperature, select a first clock speed according to a first execution policy corresponding to a designated application; execute the application based on the first clock speed; and if the external temperature is greater than or equal to the first temperature, select a second clock speed according to a second execution policy which is different from the first execution policy, and execute the application based on the second clock speed.

According to various embodiments, the processor 310 may increase or decrease the first clock speed based on a variation in the external temperature according to the first execution policy, and may decrease the second clock speed based on the external temperature according to the second execution policy.

According to various embodiments, if the external temperature is greater than a second temperature which is greater than the first temperature, the processor 310 may configured to terminate the application.

The invention claimed is:

1. An electronic device comprising:
a temperature sensor;
a display; and
a processor,
wherein the processor is configured to:
execute a designated application;
identify an external temperature using the temperature sensor during at least a partial time while the designated application is being executed; and
execute the designated application using a selected clock speed according to a designated clock governor,
wherein the selected clock speed is restricted below a predetermined clock speed if the external temperature falls within a second designated temperature range, and the selected clock speed is permitted to exceed the predetermined clock speed if the external temperature falls within a first designated temperature range, wherein the second designated temperature range is lower that the first designated temperature range.

2. The electronic device as claimed in claim 1, wherein the processor is configured to select a third clock speed obtained by applying a first weight and a second weight, determined based at least on the external temperature, to a first clock speed and a second clock speed related to execution of the designated application.

3. The electronic device as claimed in claim 2, wherein, if the external temperature falls within the second designated temperature range, the processor is configured to exclude at least one clock speed that exceeds the third clock speed according to the designated clock governor.

4. The electronic device as claimed in claim 2, wherein the second clock speed is lower than the first clock speed, and the first weight is configured to have a lower value as the external temperature becomes lower.

5. The electronic device as claimed in claim 2, wherein the first clock speed and the second clock speed are determined based on machine learning which uses at least one parameter, including a clock speed, as a reward.

6. The electronic device as claimed in claim 5, wherein the at least one parameter further comprises at least one of a current provided to the processor, power, a frame per second (FPS) of the designated application or a temperature of the electronic device.

7. The electronic device as claimed in claim 2, wherein the first clock speed and the second clock speed are determined for each application.

8. The electronic device as claimed in claim 1, further comprising: a battery,
wherein the processor is configured to receive power corresponding to the selected clock speed from the battery.

9. The electronic device as claimed in claim 1, wherein the processor is configured to identify the external temperature based on a first temperature measured by the temperature sensor and a second temperature calculated using machine learning.

10. The electronic device as claimed in claim 9, wherein the processor is configured to:
select the second temperature which is the closest to the measured first temperature from among a plurality of second temperatures corresponding to a plurality of reference temperatures; and
identify the external temperature based on the measured first temperature and the selected second temperature.

11. A method of controlling a clock speed of an electronic device, the method comprising:
executing a designated application;
identifying an external temperature of the electronic device during at least a partial time while the designated application is being executed; and
executing the designated application using a selected clock speed according to a designated clock governor,
wherein the selected clock speed is restricted below a predetermined clock speed if the external temperature falls within a second designated temperature range, and the selected clock speed is permitted to exceed the predetermined clock speed if the external temperature falls within a first designated temperature range, wherein the second designated temperature range is lower that the first designated temperature range.

12. The method as claimed in claim 11, further comprising: selecting a third clock speed obtained by applying a first weight and a second weight, determined at least based on the external temperature, to a first clock speed and a second clock speed related to execution of the designated application.

13. The method as claimed in claim 12, further comprising: if the external temperature falls within the second designated temperature range, excluding at least one clock speed that exceeds the third clock speed according to the designated clock governor.

14. The method as claimed in claim 12, wherein the second clock speed is lower than the first clock speed, and the first weight has a lower value as the external temperature becomes lower.

15. The method as claimed in claim 11, wherein the executing the designated application comprises:
    receiving power corresponding to the selected clock speed from a battery.

\* \* \* \* \*